Feb. 26, 1929.  M. E. ROE  1,703,174
BICYCLE
Filed Jan. 22, 1926   2 Sheets-Sheet 1
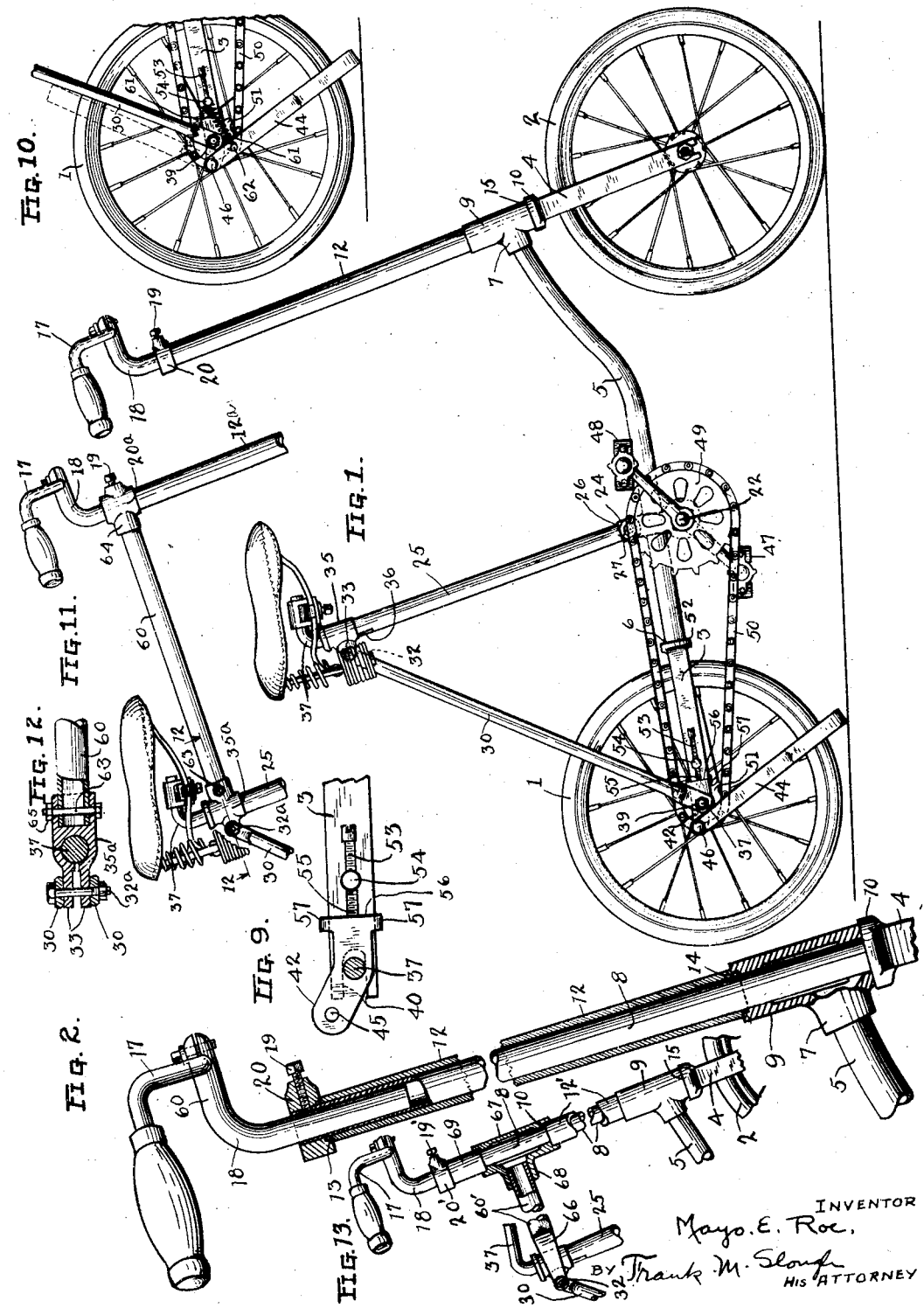
INVENTOR
Mayo. E. Roe.
BY Frank M. Slough
HIS ATTORNEY Feb. 26, 1929.

M. E. ROE 1,703,174

BICYCLE

Filed Jan. 22, 1926

INVENTOR
Mayo E. Roe
BY Frank M. Slough
HIS ATTORNEY.

Patented Feb. 26, 1929.

1,703,174

UNITED STATES PATENT OFFICE.

MAYO E. ROE, OF ELYRIA, OHIO, ASSIGNOR TO THE COLSON COMPANY, A CORPORATION OF OHIO.

BICYCLE.

Application filed January 22, 1926. Serial No. 82,931.

My invention relates to bicycles and particularly to a type employing small front and rear wheels relative to the size of wheels commonly employed.

An object of my invention is to provide a bicycle having a relatively high steering post and seat supporting frame, and employing relatively small wheels which may be ridden, commonly by juveniles, and which may be more readily manipulated than the ordinary type of bicycle, so that it may be ridden on sidewalks, and the like, at slow speeds.

Another object of my invention is to provide a bicycle of the above general character, which may be manufactured inexpensively but which, when completed, will be sturdy and durable.

Another object of my invention is to provide improved means for joining the different portions of the vehicle, whereby the tension of the driving chain may be adjustably regulated.

Another object of my invention is to provide a construction permitting a collapsing of the upstanding portions of the vehicle frame for purposes of shipment within a relatively low and preferably rectangular container for shipment, and which parts may be readily restored to operative assembled condition after being so shipped.

Another object of my invention is to provide an improved bicycle steering post assembly.

Other objects of my invention and the invention itself will become more apparent as the description of an embodiment thereof progresses, and in which description reference will be had to the accompanying drawings illustrating the said embodiment, which drawings form a part of this specification.

Referring to the drawings:

Fig. 1 shows an embodiment of my invention in elevation;

Fig. 2 shows an enlarged elevational view partly in section, with a portion broken away, of the steering post and associated parts;

Fig. 9 shows a detail comprising the chain tightening adjustment and a bracket supporting element, enlarged;

Fig. 10 shows an improvement which I sometimes apply to the vehicle supporting stand mechanism;

Figs. 11 and 12 illustrate a further variant form of bicycle embodying my invention; and Fig. 13 illustrates another embodiment.

Figure 3:
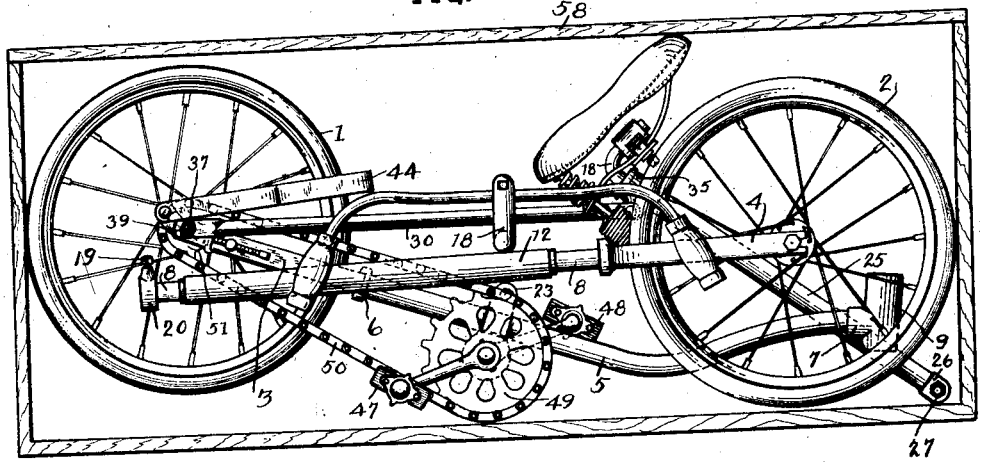
Fig. 3 shows in elevation the bicycle of the foregoing figures in collapsed condition and disposed within a rectangular shaped box container for shipment.
Figure 4:
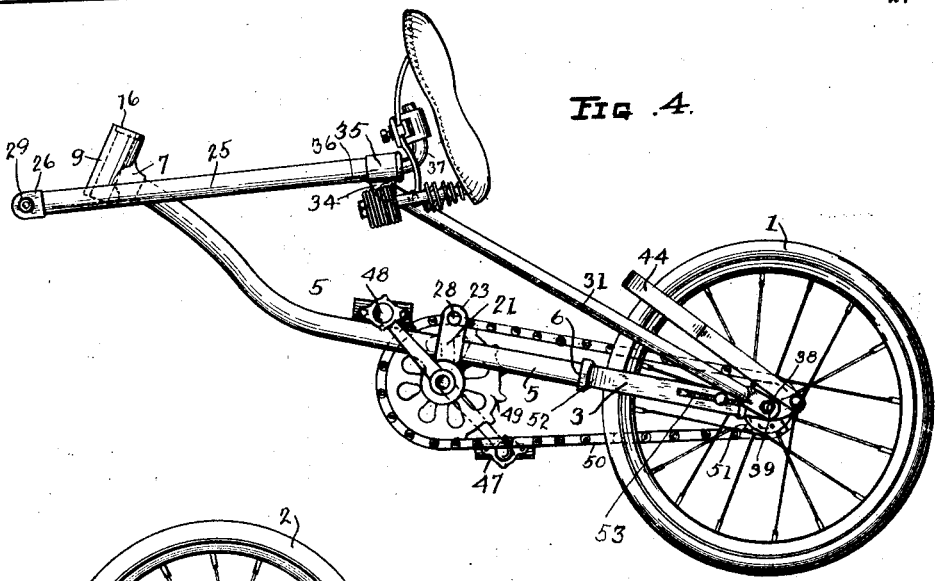
Fig. 4 shows in elevation a portion of the vehicle frame in collapsed form.
Figures 5, 6, 7:
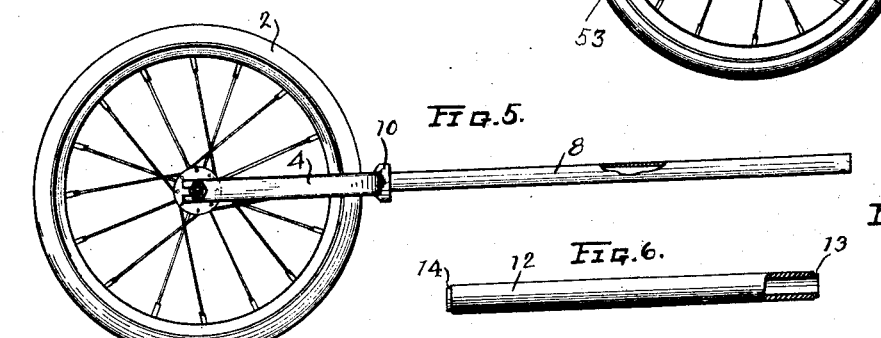
Figs. 5, 6, 7 and 8 show the various parts comprised in the steering fork assembly, disassembled.
Figure 8:
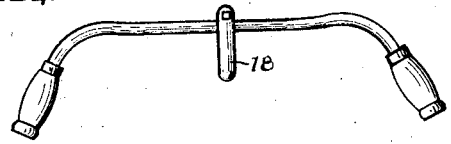

Referring now to all of the drawings, in all of which like parts are designated by like reference characters, at 1, I show a rear bicycle wheel and at 2, a front bicycle wheel, the rear wheel being rotatably mounted between the ends of the rear fork prongs 3 and the front wheel being rotatably mounted in the fork 4. A backbone frame member 5 is rigidly secured at its rear end 6 to the rear fork, and at its forward end, at 7, carries rigidly a steering post 8, which is in the form of a tube and is journaled within the steering head 9, which steering head has an upwardly extending socket portion 7, into which the lower backbone frame member 5 is inserted and to which it is rigidly attached, and whereby the steering head 9 becomes an integral part of the lower frame member 5. The steering post 8 is rigidly fitted within a socket within the bridge 10 of the front forks, passing through the said intermediate portion and being fixedly attached thereto in any suitable way, such as by riveting or welding. The bridge 10 is also recessed at 11, in order to receive the bottom tubular end 15 of the steering head 9. An outer tube 12, having reduced ends 13 and 14, is adapted to be placed over the steering post 8, and to have its reduced end 14 seated in the recess 16 in its upper surface.

A stem 18 carries at its upper forward end handle bars 17 and is insertable within the upper end of the hollow steering column 8, the outer tube 12 being previously placed over the steering column 8. A set screw 19 passing through a clamping cap 20, which is recessed on its under side for the reception of the tube 12, securely clamps the cap 20, the tube 8 and the stem 18 together, and at the same time holds the tube 12 in position between the cap 20 and the steering head 9, the reduced ends of the tube 12 fitting within recesses of the cap and head, respectively, as best illustrated in Fig. 2.

At 21, I show a perforated crank hanger rigidly carried on the lower frame member 5 and containing in its lowermost portion supporting bearings for the crank shaft 22 extending transversely through the said lower portion and having upwardly extending, laterally disposed, transversely perforated lugs 23 and 24. The seat supporting frame mast 25, having an enlarged lower end with flattened lateral sides, as shown at 26, is adapted to be mounted with its enlarged flattened lower end 26 disposed between the lugs 24 and bolt 27 extending transversely through the apertures 28 in the lugs 23 and 24 and through the transverse opening 29, extending through the enlarged flattened end 26 of the mast member 25 to provide a swivel mounting for the frame member 25. Diverging backstay frame members 30 and 31 are provided to hold the seat supporting mast element 25 in given angular position relative to the portion of the lower frame member 5 upon which it is swivelly mounted. A bolt 32 passes through the upper ends of the two back-stay rods 30 and 31, and the rearwardly extending lugs 33 and 34 of the contractible upper band element 35, which is preferably rigidly secured upon the upper end of the seat supporting frame mast 25, and which element is slitted in its rear upper end portion, as indicated at 36, to permit its being contracted upon the seat post 37 whenever the bolt 32 is tightened, whereupon the back-stays 30 and 31 are rigidly secured to the lugs 33 and 34 of the clamping collar 35, which in turn contracts upon the contractible upper end of the seat supporting mast 25 to clamp the seat in position. The lower ends of the stay rods 30 and 31 are pierced to permit the outer ends 37 and 38 of the rear axle to pass therethrough, securing nuts 39 being provided at either end to securely clamp the lower ends of the back stays in position on the rear axle, and also to clamp thereon the rear ends of the rear forks 3 upon the axle.

As shown in Fig. 9, the rear ends of the rear forks 3 have longitudinally extending slots 40 extending therein, and the ends 37 and 38 of the rear axle are adapted to enter these slots, a pair of perforated bracket elements 41 being also fitted over the ends 37 and 38, respectively, of the axle between the lower flattened end of the back-stay rods 30 and 31, respectively, and the slotted ends of the forks 3 and clamped therebetween by the tightening of the nuts 39 on the axle ends.

Rearwardly and upwardly projecting portions 42 of the brackets 41 carry the substantially U-shaped stand 44 pivoted at 45 on the bracket ends 42 by rivets 46 passing through the ends of the U-shaped stand and bracket ends 42. Pedals 47 and 48 are mounted in the usual manner on the crank shaft 22, as also is a sprocket 49 embraced by a propelling chain 50 passing over the sprocket 49 and a sprocket wheel 51, which is carried on the rear wheel 1 to drive the same.

I preferably rigidly secure the crank hanger 21 upon the lower frame member 5 by forcing the frame member 5 through the longitudinal extending aperture in the crank hanger prior to riveting or otherwise securing the rear end of the frame 5 to the bridge portion 52 of the rear forks. I preferably provide for the adjustment of tension of the chain 50, a pair of adjusting screws 53 at the outer side of each rear fork 3, screw threaded through outwardly extending lugs 54, which are rigidly secured on the outer face of each rear fork 3 and forcing the ends 55 of such adjusting screws against the forward edge 56 of the brackets 41. The brackets 41 have inwardly extending ears 57 adapted to fit over the top and lower edges of the rear fork, so that they may not rotate on the reduced ends 37 of the axle, and by passing the adjusting screws 53, the bracket elements 41 are moved upwardly on the rear ends of the rear forks 3, carrying the axle 37 rearwardly and tightening the chain 50.

In Figs. 3 to 8, inclusive, I show different phases of the collapsing and packing operations. Figs. 5 to 8, inclusive, show the disassembled parts 8, 20, 12 and 18, separated from the steering head 16 by merely the unscrewing of the clamping set screw. The bolt 27 is removed also and then replaced, preferably through the enlarged end 26 of the seat supporting frame element 25 and the end 26 lifted from its position between the lugs 23 and 24, and the frame mast 25 swiveled about its pivotal connection with the back-stays 30 on the bolt 39 to take the position shown in Fig. 4, whereupon the part shown in Fig. 4 may be disposed within a low rectangular container, as illustrated in Fig. 3, and the other parts shown in Figs. 5 to 8, inclusive, may be placed therein in compactly disposed positions.

Suitable packing materials, such as blocks of wood, loose or secured to the box 58 but not shown herein, will be understood as being preferably used to secure and wedge the different parts in position within the box and to keep them from being jostled about in their packed position. Certain of the parts, such as frame mast 25, the steering post outer tube 12, and other parts, may be suitably wrapped with paper or other material to prevent abrasion of the finish placed upon these parts.

When the bicycle of my invention reaches its destination, it may be removed from the box and reassembled by replacing the bolt 27 and the cap and set screw 19 in their proper places, whereupon the bicycle is ready to be operated.

It will be noted also that swiveling the frame mast 25 on the upwardly extending lugs 24 and 23 permits the ready collapsing of the bicycle, and at the same time enables the seat post 25 to be tilted to accommodate the different adjustments required to be made, by virtue of the adjusting screws 53 to tighten the chain, and permit back-stays, such as 30 and 31, of varying length to be used, as well as seat supporting mast elements 25 of varying frame lengths to be used interchangeably with the same bicycles to accommodate the preference of the rider and the demands of the trade. A dealer handling these bicycles and having an additional supply of the frame members 25 and 30 also may, with a given size stock of complete bicycles, be able to sell vehicles for riders of varying size. The height and disposition of the handle bars 17 may be varied by raising and lowering the stem 18 with reference to the tube 8, and by inverting the handle bars 17, so that the grip portions will be, when desired, disposed in a lower plane than the forwardly extending upper end portion 60 of the stem.

The wheels 1 and 2, it will be noted, are of the size commonly employed in that class of children's vehicles commonly known as scooters, and I therefore differentiate them from ordinary bicycle wheels of much larger size by calling them scooter type wheels, and although I may vary their size somewhat, in the embodiment illustrated, I preferably make them about one foot in diameter.

In Fig. 10, I illustrate a spring 61 joining the lug 54 and a lug 62 provided on the stand 44, whereby when the stand 44 is swung upwardly or downwardly from the horizontal position, the spring will resiliently maintain the stand in its upper or lower adjusted position, the spring being extended against its inherent resiliency to a greater degree when the stand is extending upwardly from the vehicle in a substantially horizontal position.

In Fig. 9, the chain adjusting elements 42 and 53 are illustrated, enlarged, and would otherwise occlude parts removed. Turning the screw 53 in the lug 54 in a clockwise direction will tighten the chain 50.

In Figs. 11 and 12, I show as a further feature of improvement, forwardly extending hollow bosses 63 and 64 for the parts 35$^A$ and 20$^A$, corresponding to the parts 35 and 20, respectively, of the other figures. The reenforcing bar 60 may be, and preferably will be, rigidly secured within the said bosses as by shrinking the boss 64 upon an end of the reenforcing tube 60 or in any other suitable way; preferably also by removably securing the end of the tube 60 within the boss 63 by inserting the bolt 64 through aligned openings through the walls of the boss and the end of the tube and placing the nut 65 on the end of the bolt. The steering column tubes in this modification may be made shorter than the corresponding tubes of the other figures and the part 20$^A$ will be made removable therefrom by withdrawing the said screw 19 just as described for the part 20, corresponding thereto.

By removing the bolt 63 and withdrawing the said screw 19, the parts may be disassembled and collapsed and packed substantially as illustrated in Figs. 3 to 8, inclusive, except that in addition, the bar 60 carrying on its end the part 20$^A$ will be removed as a unit and placed within the container longitudinally thereof.

Referring now to the embodiment illustrated in Fig. 13, at 60', I show a reenforcing bar having clevis fork prongs 66 at its rear end, the prongs being perforated at their ends whereby the bolt 32, which passes through the upper flattened ends of the back-stays 30 and 31, is passed also through the perforations in the fork prongs 66, whereby the frame element 60' will make a swiveling connection on the bolt 32. Carried on the end of the tube 60' and rigidly secured thereto, I provide a tubular T-head 67. The forward end of the tube 60' is fitted rigidly within the boss 68 of the T-head, which contains a bore transverse to the boss 68 for the reception of an outer steering tube element 69 of short length, the bore having a shoulder 70 upon which the bottom end of the tube 69 may rest, the outer tube 12' disposed below the T-head fitting into the lower end of the bore and bearing against the bottom end of the tube 69. The tubes 69 and 12' and the T-head 67 are positioned in longitudinal alignment by the clamping collar 20' having the set screw 19', and which collar and set screw are as illustrated in Fig. 1.

With the construction illustrated in Fig. 13, when the frame is collapsed and the steering column disassembled by the loosening of the said screw 19' and the removal of the collar 20' from the clamping engagement, the T-head 67 is removed from the column and the swiveling connection about the bolt 32 will permit the tubular frame element 60' to be rotated about the bolt 32 as a pivot to permit of same compactly packing the pivotally attached mast 25, back-stays 30 and 31 and reenforcing frame 60'.

The arrangement shown in Fig. 13 is very adaptable for use also in converting a girl's-type bicycle, as illustrated in Fig. 1, to a boy's-type bicycle, the tube 12 of the girl's bicycle being replaceable by the tubes 12' and 69 and the tubular frame element 60' with attached T-head 67 being secured in position by the bolt 32 and the set screw 19' of the collar 20', which collar and set screw are identical with those shown at 20 and 19 in Fig. 1.

Having now described my invention in a specific embodiment, I am aware that numerous and extensive departures may be made from my invention herein illustrated and described without departing from the spirit thereof.

What I claim is:

1. In a bicycle, the combination with a pair of wheels of the scooter type, a backbone terminating in a steering head at the front end and rear fork prongs at the other end, a steering column mounted on the front wheel journalled in the said steering head, a rear axle for the rear wheel secured to the ends of the said prongs, a bracket rigidly secured upon said backbone at an intermediate portion thereof and comprising an upwardly extending lug and a downwardly depending crank hanger, a crank shaft terminating at either side of the vehicle in pedal cranks journalled within the depending portion below the backbone, a seat supporting mast making swiveling connection at its lower end with the said lug and a back-stay element detachably and swivelably connected at its upper end to the upper portion of said mast and secured at its lower portion to the rear ends of said fork prongs.

2. In a bicycle, the combination with a pair of wheels of the scooter type, a backbone terminating in a steering head at the front end and rear fork prongs at the other end, a steering column mounted on the front wheel journaled in the said steering head, a rear axle for the rear wheel secured to the ends of the said prongs, a bracket rigidly secured upon said backbone at an intermediate portion thereof and comprising an upwardly extending lug and a downwardly depending crank hanger, a crank shaft terminating at either side of the vehicle in pedal cranks journaled within the depending portion below the backbone, a seat supporting mast making swiveling connection at its lower end with the said lug, and a bracing frame element detachably connected to the upper portion of said mast and making a pivotal connection with the said backbone at a point to the rear of said bracket.

3. In a bicycle, the combination with a pair of bicycle wheels of the scooter type, a backbone terminating in a steering head at its front end and rear fork prongs at the other end, a steering column comprising a front wheel fork bearing portion and an upper extending tube journaled in the said steering head and projecting therethrough, a bracket integrally secured to said backbone at an intermediate portion and comprising an upwardly extending lug and a downwardly depending crank hanger portion, a crank shaft terminating at either side of the vehicle in pedal cranks and journaled within the depending crank hanger portion and said supporting mast, making detachable swiveling connection at its lower end with the said lug, and a reenforcing frame element extending from an upper portion of the said mast to the steering column upper portion and removably and swivelably secured at each end to the mast and steering column, respectively.

4. In a bicycle, the combination with a pair of bicycle wheels of the scooter type, a backbone terminating in a steering head at its front end and rear fork prongs at the other end, a steering column comprising a front wheel fork bearing portion and an upper extending tube journaled in the said steering head and projecting therethrough, a bracket integrally secured to said backbone at an intermediate portion and comprising an upwardly extending lug and a downwardly depending crank hanger portion, a crank shaft terminating at either side of the vehicle in pedal cranks and journaled within the depending crank hanger portion and said supporting mast, making detachable swiveling connection at its lower end with the said lug, said frame being of the so-called diamond type and comprising a reenforcing tube extending between the upper portions of the mast and steering column and removably swivelably secured thereto.

5. In a bicycle, a pair of longitudinally aligned spaced front and rear wheels, a frame supported on the wheels comprising a backbone, a front steering fork supporting the front end of the backbone upon the front wheel, said backbone terminating at its rear end in a rear fork between the prongs of which the rear wheel is adapted to be rotated, a bracket rigidly secured on the backbone intermediate its end having a depending crank hanger portion and an upstanding lug, a seat supporting mast swivelably connected to said lug, a back stay element comprising a pair of back stay arms, said element making swivelable connection with the upper portion of said mast, means slidable on the rear ends of the fork prongs making swivelable connection with the lower ends of the mast arms, adjusting means to adjustably limit the forward sliding movement of said slidable means, the rear wheel being rotatably mounted between the ends of the arms and movable forwardly and rearwardly with said slidable means, a crank terminating in pedals journalled in said bracket crank hanger portion, a sprocket wheel on said crank, a second sprocket wheel on said rear wheel, an endless driving chain carried by the sprockets, said adjusting means adapted to tighten and loosen the chain, said mast backbone and back stays adapted to be collapsed into compact packing form relative to each other upon disassociation of one of said swivelable connections.

6. In a bicycle, a frame therefor comprising several frame members arranged in triangular forms being swivelably joined at their ends, one of said members comprising a seat supporting mast, another comprising a backbone and the third comprising joining back stays extending between the upper end of the mast and the rear end of the backbone, a rear wheel journalled between the lower ends of the stays, a driven sprocket wheel carried by said wheel, a driving sprocket supported by said backbone adjacent the junction of said backbone and said mast, an endless driving chain embracing said sprocket wheels, means supportably joining the back stay ends to the backbone comprising means slidable on the backbone and means to vary the slidable relation of said means to the backbone so as to predetermine the tautness of chain adjustment, said triangular frame adapted to be collapsed with the mast and back stays projecting longitudinally along the backbone upon disassociation of one of the said swivelable connections and swivelling movement of the other pair of swivelable connections for packing purposes.

In testimony whereof I hereunto affix my signature.

MAYO E. ROE.